Oct. 25, 1927.
A. R. PRIBIL
PISTON
Filed May 10, 1926
1,646,871
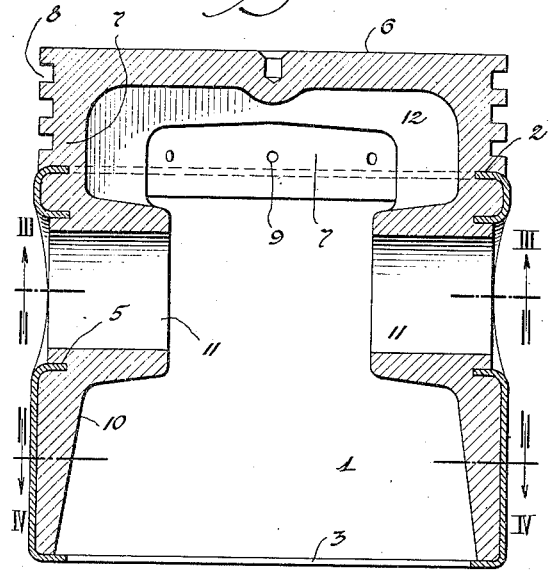
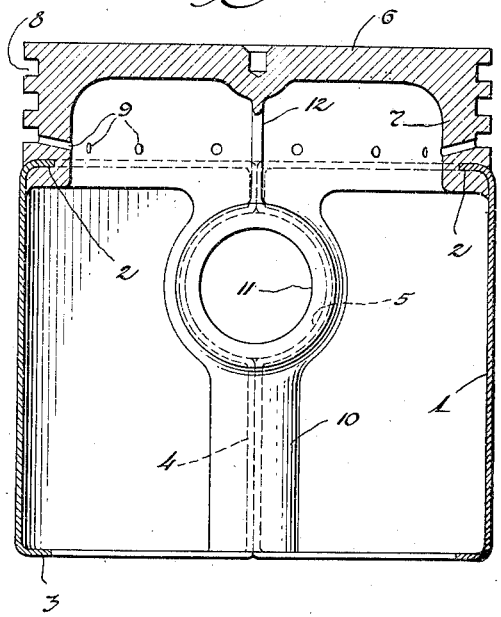
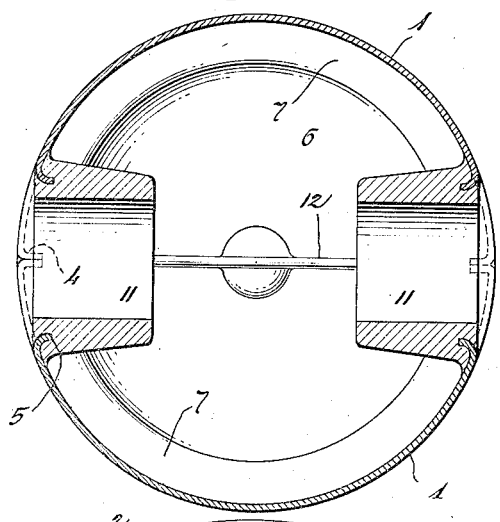
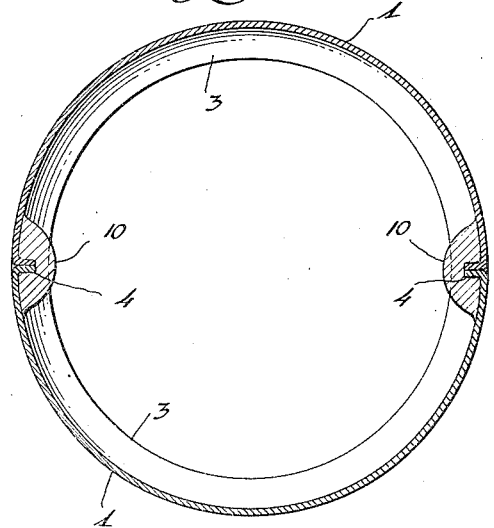
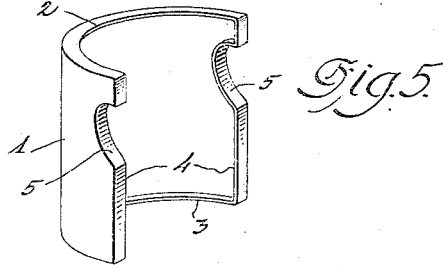
Inventor:
Alexis R. Pribil
By
Attorneys.

Patented Oct. 25, 1927.

1,646,871

UNITED STATES PATENT OFFICE.

ALEXIS R. PRIBIL, OF SAGINAW, MICHIGAN.

PISTON.

Application filed May 10, 1926. Serial No. 107,996.

This invention relates to pistons, and has special reference to that class of pistons including cast heads and sheet metal bodies or skirts. In this class of pistons I have seen piston skirts or shells that are unevenly worn and in many instances the worn portion of the piston skirt or shell is at welded, brazed or otherwise connected joints of the piston parts, so that the shell structure is materially weakened and will not withstand use to any great extent. I have in mind a piston skirt or shell formed from a single piece or one or more pieces of material having welded joints in a plane at a right angle to a connecting rod bearing with the result that the piston walls, between the connecting rod bearings have been greatly worn and show a weakness that should not appear in a good piston. From such observations and experience in piston manufacture, I have learned that those walls of the piston subjected to wear must not be interrupted by any joined or weakened portions, therefore I have devised a piston skirt or shell composed of halves joined together with the joints in the same plane as the connecting rod bearings, consequently the walls of the shell are maintained intact without any weakened or distorted portions. The strain on the piston is more uniformly distributed and by reason of the skirt halves being joined in the plane of the connecting rod bearings, I use such bearings as part of the connecting means for the skirt halves.

I have also devised a piston wherein an aluminum or alloy head is cast on a sheet metal skirt with the head affording connecting rod bearings and opposed stiffening members for the skirt or shell of the piston. With the rod bearings and reinforcing members forming part of the piston head, the stresses and strains incident to piston operations are not transferred to the sheet metal skirt or shell of the piston but are borne directly by the head. With the piston shell relieved of any such stresses or strains a positive and reliable connection may be established between the head and skirt.

Further, I have devised a three-part piston wherein a head part affords a ready means of connecting skirt parts so that welding or other operations on the piston are reduced to a minimum. This contributes to a large production at a minimum cost and permits of such a piston being readily used at an advantage as a replacement for cast metal pistons.

The construction of my piston will be hereinafter specifically described and then claimed, and reference will now be had to the drawings, wherein Figure 1 is a longitudinal sectional view of the piston;

Fig. 2 is a longitudinal transverse sectional view of the same;

Fig. 3 is a cross sectional view taken on the line III—III of Fig. 1;

Fig. 4 is a similar view taken on the line IV—IV of Fig. 1, and

Fig. 5 is a perspective view of a skirt or shell member.

The piston which I have made consists of three parts, a head and a skirt or shell composed of two members. The shell members are designated 1 and are semi-cylindrical with the ends thereof provided with inturned flanges 2 and 3 and the side edges of each member provided with longitudinal inturned flanges 4. These inturned flanges and the shell member are further shaped to provide bearing flanges 5, all of which is best shown in Fig. 5.

The members 1 are placed in abutting relation and form a cylindrical shell and the longitudinal flanges 4 contact, as best shown in Figs. 3 and 4 and may be spot welded or otherwise connected together.

The head of the piston is designated 6 and has its side walls 7 provided with the usual piston ring grooves 8, one of which may have lubricant ports 9. The head 6 is preferably cast from aluminum or a well having a co-efficient of expansion approaching that of the shell members 1, which are preferably made of sheet metal. The head 6 is adapted to be cast on that end of the shell having the flanges 2 so that said flanges will be embedded in the side wall 7 of the head 6.

The side walls 7 of the head 6 are provided with longitudinally opposed reinforcing members 10 extending to the flanges 3 and bearing thereon, as best shown in Fig. 1. These opposed members are formed about the bearing flanges 5 so that said flanges are embedded in the reinforcing members 10. The members 10 are also formed with inwardly projecting pin bearings 11 for a connecting rod (not shown). The pin bearings 11 are braced relative to the head 6 by a transverse connecting rib or member 12 which cooperates with the longitudinal members 10 in firmly supporting the bearings 11, so that any stresses or strains set up during the operation of the piston are not distributed to the skirt or shell of the piston.

By reference to Figs. 1 and 3, it will be noted that the cast head and its members 10 inclose the flanges 2, 4 and 5 and in consequence of such inclosure the skirt or shell members 1 cannot become separated.

Obviously suitable molds are used for supporting the shell members 1 and providing a cavity into which the aluminum or alloy may be cast, and I attach considerable importance to the longitudinally opposed reinforcing members of the piston head because these members receive the end thrust incident to reciprocation of the piston. With the skirts or shell members joined in the plane of the pin bearings 11 the side walls of the shell, between the adjoining edges are uninterrupted and devoid of any joint. In consequence of this construction the piston has greater lasting qualities and may be manufactured at a comparatively small cost.

What I claim is:

1. A piston comprising a two part shell having adjoining flanges and bearing flanges, and a head attached to said shell and inclosing the adjoining flanges and bearing flanges of said shell.

2. A piston as called for in claim 1, wherein the adjoining flanges of said shell extend longitudinally of said shell and adjoin said bearing flanges.

3. A piston comprising a head, opposed bearing members carried by said head, and a shell attached to said head and to the bearing members thereof, said shell being composed of halves having edges embedded in the bearing members of said shell.

4. A piston comprising a head, opposed longitudinally disposed members carried by said head, bearings carried by said members, a reinforcing member in said head connecting said bearings, and a shell connected to said head and the members carried thereby, said shell being composed of abutting parts having bearing flanges extending into said bearings.

5. A piston comprising shell halves placed in abutting edge relation, flanges carried by the abutting edges of said shell halves and having opposed portions forming bearing flanges, inturned flanges carried by said shell halves, and a head cast on said shell halves and inclosing all of the flanges of said shell halves, said head having bearing configurations at said bearing flanges.

In testimony whereof I affix my signature.

ALEXIS R. PRIBIL.